United States Patent
Li et al.

(10) Patent No.: US 9,486,787 B1
(45) Date of Patent: Nov. 8, 2016

(54) METHOD AND APPARATUS FOR CHEMICAL PROCESS INTENSIFICATION

(71) Applicant: UNIVERSITY OF WYOMING, Laramie, WY (US)

(72) Inventors: Dongmei Li, Laramie, WY (US); Shuai Tan, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 0 days.

(21) Appl. No.: 14/857,468

(22) Filed: Sep. 17, 2015

(51) Int. Cl.
| | |
|---|---|
| *B01J 23/10* | (2006.01) |
| *B01J 23/63* | (2006.01) |
| *B01J 27/053* | (2006.01) |
| *B01J 23/44* | (2006.01) |
| *B01J 35/06* | (2006.01) |
| *B01J 35/00* | (2006.01) |
| *B01J 37/04* | (2006.01) |
| *B01J 37/14* | (2006.01) |
| *B01J 37/02* | (2006.01) |

(52) U.S. Cl.
CPC ............ *B01J 27/053* (2013.01); *B01J 23/44* (2013.01); *B01J 35/0006* (2013.01); *B01J 35/065* (2013.01); *B01J 37/0213* (2013.01); *B01J 37/04* (2013.01); *B01J 37/14* (2013.01)

(58) Field of Classification Search
CPC .......... B01J 23/10; B01J 23/44; B01J 23/63; B01J 27/04; B01J 27/053; B01J 37/0201; B01J 37/0203; B01J 37/0213; B01J 37/0234; C09K 11/7771; C09K 11/7789
USPC .............. 502/216, 217, 223, 302, 303; 252/301.4 S; 313/468
See application file for complete search history.

(56) References Cited

U.S. PATENT DOCUMENTS

| | | | | |
|---|---|---|---|---|
| 2,462,547 | A * | 2/1949 | Pitha .............. | C09K 11/7784 250/484.4 |
| 3,705,858 | A * | 12/1972 | Luckey et al. ...... | C01F 17/0093 250/482.1 |
| 5,795,554 | A * | 8/1998 | Fang ................. | B01J 21/10 423/21.1 |
| 5,853,684 | A * | 12/1998 | Fang ................. | B01D 53/8637 423/239.1 |
| 6,296,824 | B1 * | 10/2001 | Leppert ............. | C01F 17/0093 423/263 |
| 7,226,543 | B2 * | 6/2007 | Takagimi ............ | C01F 17/0093 165/4 |
| 9,138,718 | B2 * | 9/2015 | Li ...................... | C01B 3/16 |
| 2004/0198595 | A1 * | 10/2004 | Chen ................. | B01D 53/945 502/328 |
| 2010/0016149 | A1 * | 1/2010 | Machida ............ | B01D 53/945 502/217 |
| 2010/0130350 | A1 * | 5/2010 | Machida ............ | B01D 53/945 502/217 |

OTHER PUBLICATIONS

"A new continuous two-step molecular precursor route to rare-earth oxysulfides LN2O2S," N. De Crom et al. Journal of Solid State Chemistry 191 (2012), pp. 195-200.*

(Continued)

*Primary Examiner* — Patricia L Hailey
(74) *Attorney, Agent, or Firm* — Patterson & Sheridan, LLP (57) ABSTRACT

Embodiments disclosed herein generally relate to methods and apparatus for simultaneous generation and separation processes. The apparatus provides a membrane module including a substrate, a catalytic layer and a membrane layer. The catalytic layer includes nano-sized sulfur-tolerant catalysts and/or particles. As a result, the apparatus can operate in sulfur-free and sulfur-laden (sour gas) environments for water gas shift (WGS) reactions while maintaining high reaction conversion. Methods for forming catalytic films are also disclosed herein. In one embodiment, methods of forming lanthanide containing oxysulfate nanocatalysts are provided.

20 Claims, 5 Drawing Sheets

(56) References Cited

OTHER PUBLICATIONS

"Sulfur-tolerant lanthanide oxysulfide catalysts for the high-temperature water-gas shift reaction," Ioannis Valsamakis et al. Applied Catalysis B: Environmental 106 (2011), pp. 255-263.*

"New Type of Sodium Ion Conducting Solid Electrolyte Based on Lanthanum Oxysulfate," N. Imanaka et al. Electrochemical and Solid-State Letters, 5 (9), 2002, pp. E-51-E53.*

"General synthetic strategy for high-yield and uniform rare-earth oxysulfate ($RE_2O_3SO_4$, Re = La, Pr, Nd, Sm, Eu, Gd, Tb, Dy, Y, Ho, and Yb) hollow spheres," Xiaohe Liu et al. RSC Advances, 2012, 2, pp. 9362-9365.*

"$Ln_2(OH)_4SO_4$ $nH_2O$ (Ln = Pr to Tb; n -2): A New Family of Layered Rare-EArth Hydroxides Rigidly Pillared by Sulfate Ions," Jianbo Liang et al. Chemistry of Materials, 2010, 22, pp. 6001-6007.*

"Layered Pr-dodecyl sulfate mesophases as precursors of $Pr_2O_2SO_4$ having a large oxygen-storage capacity," Masato Machida et al. J. Mater. Chem., 2006, 16, pp. 3084-3090.*

* cited by examiner

METHOD AND APPARATUS FOR CHEMICAL PROCESS INTENSIFICATION

BACKGROUND

1. Field

Embodiments described herein generally relate to methods and apparatus for simultaneous generation and separation processes. More specifically, embodiments include a membrane reactor for use in an apparatus for gas to gas or gas to liquid simultaneous generation and separation processes. Also described herein are embodiments describing methods for forming nanocatalysts which may be utilized in simultaneous generation and separation processes.

2. Description of the Related Art

Coal and natural gas resources are projected to provide greater than 40% of global energy demand over the next twenty plus years. In order to abate the global warming by reducing greenhouse gas emission in power plants, industries, transportation, etc., advanced technologies are being developed to enable clean, efficient and environmentally friendly use of these energy resources. As one of the advanced conversion technologies, coal gasification provides an efficient and flexible approach to utilize abundant energy resources with minimized pollution to the environment. During a coal gasification process, coal is heated and exposed to oxygen and steam, and the oxygen and water molecules oxidize the coal and produce a gaseous mixture of carbon dioxide, carbon monoxide, water vapor and hydrogen. The gaseous mixture then undergoes a water gas shift (WGS) reaction to produce hydrogen. Various membrane reactors are used to simultaneously generate and separate hydrogen.

One example of a membrane reactor is a compact catalytic membrane reactor (CCMR). A CCMR typically includes a membrane module that has a catalytic film. The catalytic film includes a porous layer having nano-sized catalysts deposited therein. As reactant gases pass through the catalytic film, hydrogen gas is generated. The catalytic film is also integrated with a membrane layer permeable to the hydrogen gas. As the hydrogen gas permeates through the membrane layer, the thermodynamics of the reaction are shifted toward hydrogen production. The hydrogen gas is produced and separated simultaneously in the CCMR. However, persisting issues with membranes or membrane modules for simultaneous hydrogen generation and separation include sulfur poisoning and low hydrogen flux.

Typically, the WGS reaction involves a high temperature shift (HTS) followed by a low temperature shift (LTS). Commercial HTS catalysts include a combination of iron (Fe) oxide materials and chromium (Cr) oxide materials. However, the catalytic activity of HTS catalysts can be substantially reduced in sulfur feed gas environments. Commercial LTS catalysts, such as copper-zinc (Cu—Zn) materials, are very sensitive to less than 0.1 ppm sulfur, resulting in almost 100% activity loss.

Pre-sulfided catalysts, such as cobalt-molybdenum-sulfide (CoMoS) materials and cobalt chromium oxide-sulfide ($CoCr_2O_4S$) materials, have little or no obvious activity loss in sulfur-laden conditions. However, common pre-sulfided catalysts demonstrate low activity and sulfur loss during the WGS reaction, and methane byproduct formation in sulfur-free conditions. Without the need for pre-treatment of sulfur in syngas for WGS, operational and capital costs can be significantly alleviated or reduced.

Therefore, improved methods and apparatus for simultaneous generation and separation processes are needed.

SUMMARY

In one embodiment, a method for forming nanocatalysts is described. The method includes mixing at least one organic solvent with at least one surfactant to form a composition, mixing the composition with a lanthanide containing material to form a lanthanide containing sulfide nanocatalyst, and exposing the lanthanide containing sulfide nanocatalyst to oxygen and heat to form a lanthanide containing oxysulfate nanocatalyst.

In another embodiment, a method for forming a catalytic film is described. The method includes mixing at least one organic solvent with at least one surfactant to form a composition, mixing the composition with a lanthanide containing material to form a lanthanide containing sulfide nanocatalyst, and exposing the lanthanide containing sulfide nanocatalyst to oxygen and heat to form a lanthanide containing oxysulfate nanocatalyst. A porous oxide layer of a catalytic membrane module may be impregnated with the lanthanide containing oxysulfate nanocatalyst to form a catalytic film and the catalytic film may be disposed between a membrane layer and a porous support layer.

In another embodiment, a method for forming a catalytic film is described. The method includes mixing at least one organic solvent with at least one surfactant to form a composition, mixing the composition with a lanthanide containing material to form a lanthanide containing sulfide nanocatalyst, and exposing the lanthanide containing sulfide nanocatalyst to oxygen and heat to form a lanthanide containing oxysulfate nanocatalyst. A porous oxide layer of a catalytic membrane module may be impregnated with the lanthanide containing oxysulfate nanocatalyst to form a catalytic film and the catalytic membrane module may further include a porous support layer, which is disposed between the catalytic film and a membrane layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments in any field involving magnetic sensors.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments disclosed herein generally relate to methods and apparatus for simultaneous generation and separation processes. The apparatus provides a membrane module including a substrate, a catalytic film, and a membrane layer. The catalytic film includes nano-sized particles, which may enable the apparatus to operate in sulfur-free and sulfur-laden feed gas environments for WGS reactions while maintaining high reaction conversion. Embodiments described herein also include methods for forming sulfur tolerant nanocatalysts suitable for use in gas to gas or gas to liquid simultaneous generation and separation processes.

The term "palladium (Pd) layer" as utilized herein generally refers to and may include a layer containing palladium, palladium containing particles, or palladium alloy layers and/or particles. For example, a palladium layer can be a palladium transition metal alloy. Transition metals utilized to form palladium alloys may include gold, silver, aluminum, copper, ruthenium, and combinations and mixtures thereof.

The term "nanocatalyst" as utilized herein generally refers to nanometer scale materials, molecules, and/or moieties which function as catalysts. The nanocatalysts described herein may include various morphologies and characteristics configured to facilitate catalytic operations generally, and more specifically, to facilitate catalytic functions associated with gas to gas or gas to liquid simultaneous generation and separation processes.

Figure 1:
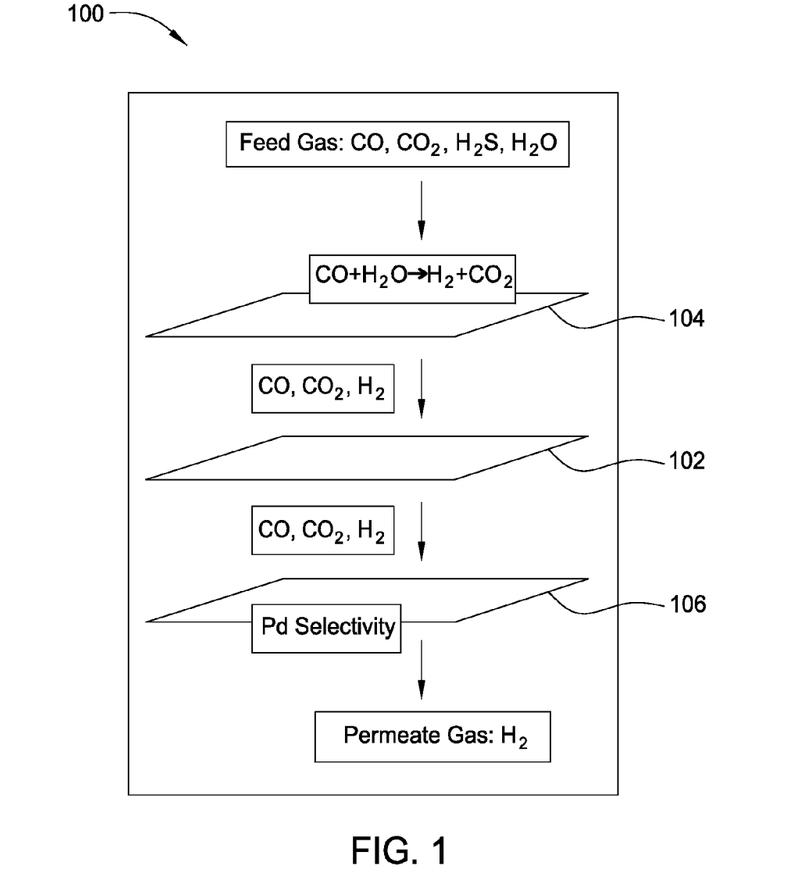
FIG. 1 schematically illustrates a membrane module according to embodiments described herein.

FIG. 1 schematically illustrates a membrane module 100 according to embodiments described herein. The membrane module 100 may be used in any suitable membrane reactor, such as a micro-membrane reactor (MMR). The membrane module 100 includes a substrate 102 for supporting a catalytic layer 104 and a palladium layer 106. The membrane module 100 may be used in any gas to gas or gas to liquid simultaneous generation and separation processes. In one embodiment, the membrane module 100 is used for simultaneous hydrogen generation and separation. The substrate 102 may be a porous material such as porous stainless steel (SS), porous ceramic, or an oxide layer. In one embodiment, the substrate 102 is a porous $ZrO_2$ substrate. The catalytic layer 104 may be coated on the substrate 102. The catalytic layer 104 may include sulfur tolerant nanocatalysts. The nanocatalysts have a particle size in the nanometer range. In one example, the nanocatalysts comprise a nano-rod structure having a length dimension between about 4 nm and about 10 nm, such as about 7 nm and a width dimension between about 1 nm and about 3 nm, such as about 2 nm.

In one embodiment, nanocatalysts comprise a lanthanide containing material. Lanthanide-coordinated complexes have applications in commercial processes due to their magnetic, catalytic, and optical properties that arise from the orbital electron organization in lanthanides. It is contemplated that lanthanide oxysulfide/oxysulfate transition systems exhibit oxygen transfer capacity between oxysulfide and oxysulfate, which is about eight times higher than that of the conventional cerium oxide transition systems. The sulfur redox capacity of the lanthanide-coordination complexes contributes to their catalytic property in dehydrogenation processes, for example, the WGS reaction. The lanthanide element in the lanthanide containing material may include any element from the lanthanide series of elements. For example, the lanthanide element may be lanthanum, cerium, praseodymium, neodymium, promethium, samarium, or europium. In one embodiment, nanocatalysts comprise lanthanum oxysulfide, europium oxysulfide, praseodymium oxysulfide, or cerium oxysulfide. In another embodiment, nanocatalysts comprise lanthanum oxysulfate, europium oxysulfate, praseodymium oxysulfate, or cerium oxysulfate.

Nanocatalysts have a much larger Brunauer-Emmett-Teller (BET) surface area compared to conventional micron-sized catalysts. A comparison of BET surface areas for different catalysts is shown in the table below. As shown in the table, the lanthanide containing nanocatalysts have higher BET surface areas compared to their micron-sized catalytic counterparts. The catalytic layer 104 having lanthanide containing nanocatalysts is believed to be stable and efficient in both sulfur-rich and sulfur-free gas stream and there is little or no permanent sulfur poisoning due to sulfur desorption on the large surface of lanthanide containing nanocatalysts. The pores in the substrate 102 act as a physical barrier, allowing for maximized catalyst surface area/catalyst mass and reduced or eliminated coking

| Sample | BET surface area ($m^2/g$) |
|---|---|
| Nano-$La_2O_2SO_4$ | 82.6 |
| Nano-$Pr_2O_2SO_4$ | 74.3 |
| Nano-$Eu_2O_2S$ | 135.4 |
| $La_2O_2SO_4$ | 46 |
| $Pr_2O_2SO_4$ | 27 |

The catalytic layer may include Pd particles that are deposited thereon using a thin film deposition process, such as atomic layer deposition (ALD). As a result of forming Pd particles in the catalytic layer using ALD, sulfur can strongly dissolve on the surface of Pd, but predominantly not on the lanthanide containing nanocatalysts. Thus, a more efficient catalytic activation may be achieved. In addition, after the deposition of the Pd particles, the lanthanide containing nanocatalysts are partially surrounded by the ALD Pd particles, which can partially or entirely block sulfur from going into the Pd layer 106 to keep the selectivity of the Pd layer 106 stable. The Pd layer 106 may be formed using ALD so the Pd layer 106 has a high purity, which may result in increased hydrogen selectivity. The use of ALD to form the Pd layer 106 also minimizes metal precursor use, enables a higher degree of deposition conformality, and reduces mechanical stress of the as deposited Pd layer 106 as a result of a high purity layer with a highly ordered crystallographic structure.

Nanocatalyst synthesis methods, as described herein, may be utilized to manufacture nanocatalyst materials which may be utilized advantageously with the membrane module 100. In one embodiment, a method for forming nanocatalysts includes mixing a solvent with a surfactant to form a composition. Examples of suitable solvents include organic solvents, such as, toluene, hexane, ethanol, or combinations and mixtures thereof, however, it is contemplated that any suitable organic solvent may be used. Examples of suitable surfactants include oleylamine, oleic acid, octadecene, or combinations and mixtures thereof. The solvent/surfactant composition is mixed with a lanthanide containing material to form a lanthanide containing sulfide nanocatalyst. Both the surfactant and the solvent may be used to manipulate the morphology of the lanthanide containing sulfide nanocatalyst. For example, the lanthanide containing sulfide nanocatalysts may be vertically standing crystalline nanoplates, for example, hexagonal or cubic crystalline nanoplates, formed by utilizing appropriate reaction conditions.

In one embodiment, the lanthanide containing material is Eu(ddtc)$_3$phen (phen=1,10-phenanthroline; ddtc=diethyldithiocarbamate). In another embodiment, the lanthanide containing sulfide nanocatalyst comprises lanthanum oxysulfide, europium oxysulfide, praseodymium oxysulfide, cerium oxysulfide, samarium oxysulfide, or neodymium oxysulfide. In another embodiment, the lanthanide containing sulfide nanocatalyst comprises lanthanide sulfide or praseodymium sulfide.

The lanthanide containing sulfide nanocatalyst, which may include an oxysulfide nanocatalyst, is heated to a temperature between about 200 degrees Celsius and about 800 degrees Celsius at a rate of between about 10 degrees Celsius/minute and about 50 degrees Celsius/minute to form a lanthanide containing oxysulfate nanocatalyst. In one embodiment, the lanthanide containing sulfide nanocatalyst is heated to a temperature of between about 400 degrees Celsius to about 600 degrees Celsius, for example, about 500 degrees Celsius. In another embodiment, the lanthanide containing sulfide nanocatalyst is heated at a rate of between about 10 degrees Celsius/minute and about 30 degrees Celsius/minute, for example, about 10 degrees Celsius/minute. Additionally, the lanthanide containing sulfide nanocatalyst may be heated for an amount of time between about 1 hour and about 7 hours, for example, about 2 hours. The lanthanide containing sulfide nanocatalyst may be heated in an oxygen containing environment, such as an ambient air environment. It is contemplated that any suitable heating source, such as an oven or furnace, may be used.

Figure 2:
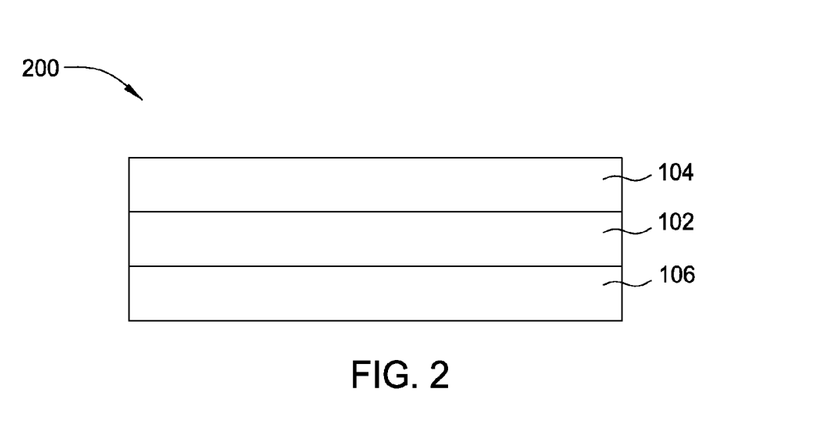
FIG. 2 schematically illustrates a membrane module for use in an apparatus for simultaneous generation and separation processes according to embodiments described herein.

It is believed that exposing the sulfide and oxysulfide nanocatalysts to heat in an oxygen containing environment facilitates oxidation of the nanocatalysts. The resulting lanthanide containing oxysulfate nanocatalysts comprise lanthanum oxysulfate, europium oxysulfate, praseodymium oxysulfate, cerium oxysulfate, samarium oxysulfate, or neodymium oxysulfate. It is contemplated than any lanthanide series element with an appreciable sulfur redox capacity may be used when forming nanocatalysts as described herein. FIG. 2 illustrates a catalytic membrane module 200 for use in an apparatus for simultaneous generation and separation processes according to embodiments described herein. The catalytic membrane module 200 may be placed in any suitable membrane reactor for gas to gas or gas to liquid generation and purification, such as hydrogen generation and purification. The catalytic membrane module 200 includes the catalytic layer 104, the Pd layer 106 and the substrate 102 disposed between the catalytic layer 104 and the Pd layer 106. As shown in FIG. 2, the layers 102, 104, 106 are substantially flat. For example, the substrate 102, the catalytic layer 104, and the Pd layer 106 may be arranged in a planar orientation.

Figure 3:
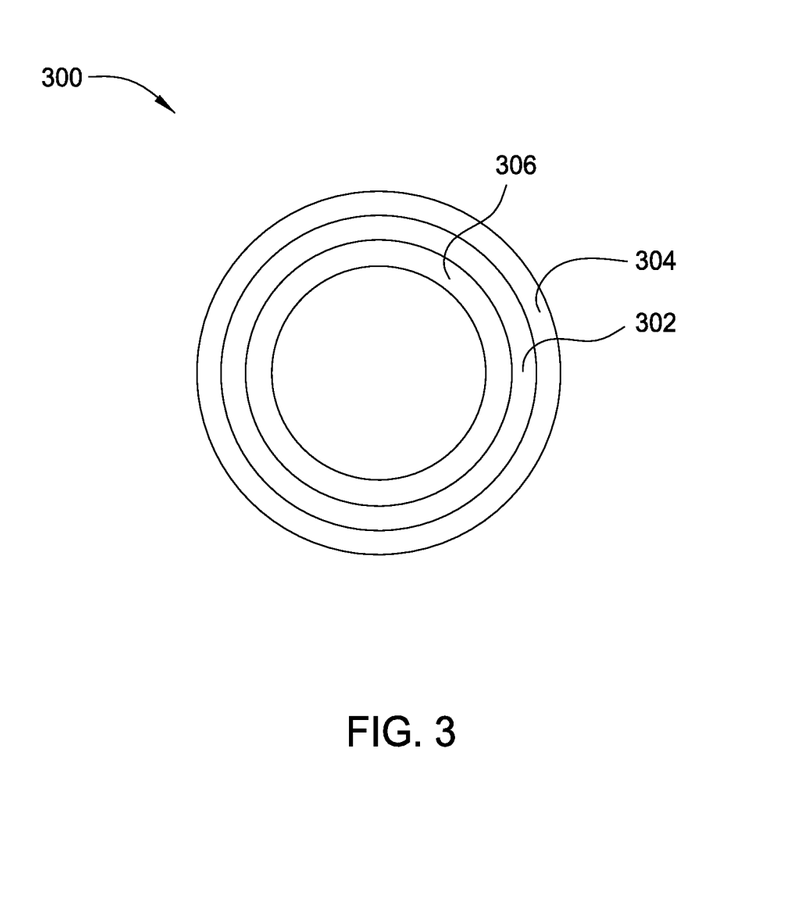
FIG. 3 is a schematic cross sectional view of a membrane module for use in an apparatus for simultaneous generation and separation processes according to embodiments described herein.

FIG. 3 is a schematic cross sectional view of a catalytic membrane module 300 for use in an apparatus for simultaneous generation and separation processes according to embodiments described herein. The catalytic membrane module 300 may be placed in any suitable membrane reactor for gas to gas or gas to liquid generation and purification, such as hydrogen generation and separation reactors. As illustrated in FIG. 3, the catalytic membrane module 300 is a tube having three tubular layers 302, 304, 306. However, it is contemplated that the catalytic membrane module 300 may be advantageously implemented in various other geometries. In one embodiment, the three layers 302, 304, 306 may have polygonal cross-sections, for example triangular, quadrilateral, pentagonal, hexagonal, heptagonal, octagonal, nonagonal, or decagonal cross-sections. In another embodiment, the three layers 302, 304, 306 may have circular or oblong cross-sections. The inner layer 306 may comprise the same material as the Pd layer 106, the middle layer 302 may comprise the same material as the substrate 102, and the outer layer 304 may comprise the same material as the catalytic layer 104.

In one embodiment, the middle layer 302 is a $ZrO_2$ tube. During formation of the catalytic membrane module 300, a surface of the $ZrO_2$ tube may be treated with an oxygen plasma for between about 20 minutes and about 60 minutes at a power between about 10 W and about 100 W, such as between about 20 W and about 30 W, for example, about 26.9 W. The oxygen plasma process may be performed at a pressure between about 100 mTorr and about 1 Torr. In one embodiment, the $ZrO_2$ tube may be treated with the oxygen plasma between about 20 to 40 minutes, for example, about 20 minutes, at a pressure between about 200 mTorr and 600 mTorr, for example, about 505 mTorr. It is believed that the oxygen plasma treatment improves adhesion between the nanocatalysts and the outer surface of the $ZrO_2$ tube. For example, the oxygen plasma treatment creates a predominantly hydroxyl group terminated surface on the $ZrO_2$ tube to enhance hydrophilicity of the ceramic tube.

The $ZrO_2$ tube may be exposed to lanthanide containing nanocatalysts, such as europium oxysulfide, lanthanum oxysulfate, or praseodymium oxysulfate, which are dispersed in a solvent, for about 24 hours while the solvent is maintained at about 130 degrees Celsius. The solvent may be used to manipulate the morphology of the lanthanide containing nanocatalysts. In one embodiment, the solvent is an organic solvent. For example, the solvent may be toluene, hexane, ethanol, or combinations and mixtures thereof. The solvent mixture is evaporated by heating the $ZrO_2$ tube or the solvent to form the outer layer 304 containing lanthanide containing nanocatalysts on the $ZrO_2$ tube (i.e. substrate 102 or middle layer 302). In one embodiment, the $ZrO_2$ tube is heated in an oven at a temperature of between about 100 degrees Celsius and about 500 degrees Celsius, such as between about 200 degrees Celsius and about 300 degrees Celsius, for example about 250 degrees Celsius. The $ZrO_2$ tube may be heated between about 2 hours and about 12 hours. In one embodiment, the operations described herein may be repeated one or more times to evenly load the nanocatalysts on the $ZrO_2$ tube. For example, the above described operations may be repeated 3 times.

It is believed that impregnating the $ZrO_2$ tube with nanocatalysts reduces the sintering effect during high temperature processes, for example, temperatures experienced during the WGS reaction. It is contemplated that the $ZrO_2$ tube minimizes nanocatalyst aggregation by anchoring the nanocatalysts in the nanopores of the $ZrO_2$ tube. It is further contemplated that the interaction between zirconia and the nanocatalyst, for example, the lanthanide containing nanocatalyst, enhances oxygen storage capability, contributing to a higher CO conversion. The table below shows the percentages of different elements at the surface of the outer layer 304. As illustrated, a high oxygen content is present at the surface of the outer layer 304.

| Element | Weight % | Atomic % |
|---------|----------|----------|
| Zr | 3.55 | 1.3 |
| Eu | 53.09 | 11.65 |
| S | 3.23 | 3.36 |
| O | 40.14 | 83.69 |

Figures 4, 5:
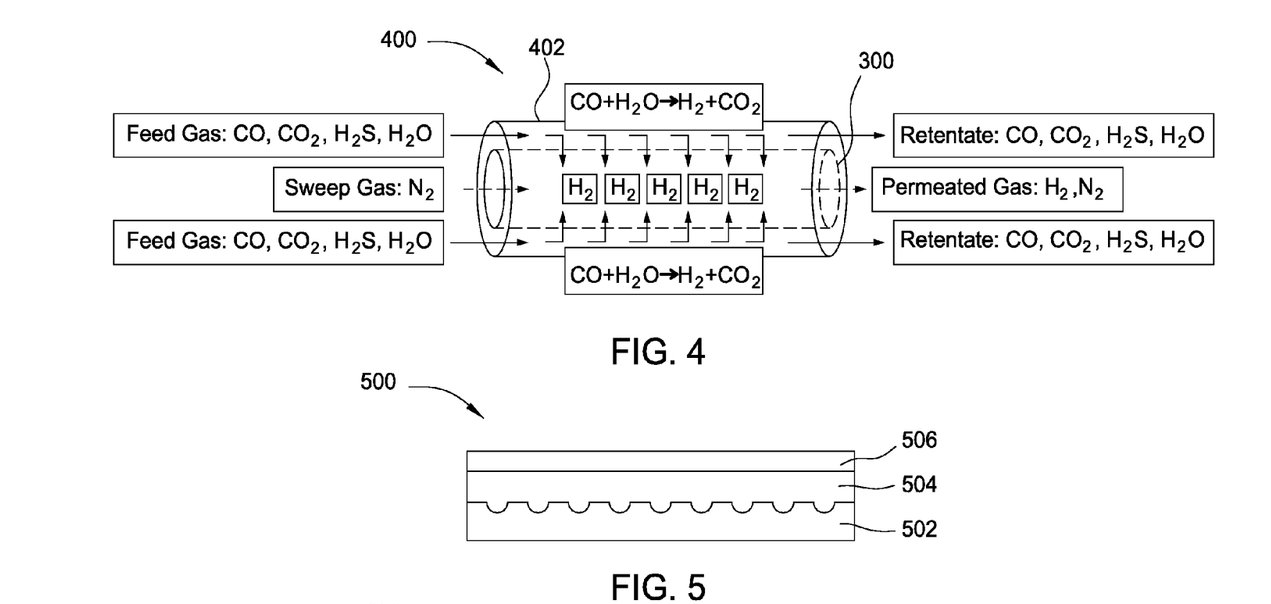
FIG. 4 schematically illustrates an apparatus including the membrane module shown in FIG. 3 according to embodiments described herein.
FIG. 5 schematically illustrates a membrane module for use in an apparatus for simultaneous generation and separation processes according to embodiments described herein.

FIG. 4 schematically illustrates an apparatus 400 including the membrane module 300 shown in FIG. 3 according to embodiments described herein. The apparatus 400 may be a MMR having an outer wall 402 and the membrane module 300. During operation, feed gases flow through the space between the outer wall 402 and the structure 300. The gases react with the nano-sized particles of the nanocatalyst in the outer layer 304 to form hydrogen, which then permeates through the middle and inner layers 302, 306. Due to the large surface area of the lanthanide containing nanocatalysts in the outer layer 304 and the ALD Pd layer of the inner layer 306, the WGS reaction for producing hydrogen is more efficient and stable in both sulfur-free and sulfur-laden environments. Additionally, the reaction thermodynamics are shifted toward hydrogen production with maximized hydrogen permeability.

FIG. 5 schematically illustrates a membrane module 500 for use in an apparatus for simultaneous generation and separation processes according to another embodiment described herein. The membrane module 500 may be placed in any suitable membrane reactor for gas to gas or gas to liquid generation and purification, such as hydrogen generation and separation reactors. An example of the membrane reactor is a compact catalytic membrane reactor (CCMR). The membrane module 500 includes a porous support layer 502, a membrane layer 506 and a catalytic film 504 disposed between the porous support layer 502 and the membrane layer 506. In one embodiment, the catalytic film 504, the membrane layer 506, and the porous support layer 502 are tubular. In one embodiment, the catalytic film 504, the membrane layer 506, and the porous support layer 502 are polygonal, for example triangular, quadrilateral, pentagonal, hexagonal, heptagonal, octagonal, nonagonal, or decagonal. In another embodiment, the catalytic film 504, the membrane layer 506, and the porous support layer 502 are oblong. In another embodiment, the catalytic film 504, the membrane layer 506, and the porous support layer 502 are circular. In yet another embodiment, the catalytic film 504, the membrane layer 506, and the porous support layer 502 are cylindrical. In another embodiment, the catalytic film 504, the membrane layer 506, and the porous support layer 502 are planar. The porous support layer 502 may comprise the same material as the substrate 102 described in FIG. 1 and the membrane layer 506 may comprise the same material as the Pd layer 106 described in FIG. 1.

The catalytic film 504 may include a layer, such as a porous oxide layer, that is impregnated with nano-sized particles. In one embodiment, the porous oxide layer comprises $ZrO_2$ having a pore size of about 100 nm and the nanocatalysts comprise a lanthanide containing nano-sized particle material disposed in the pores of the porous oxide layer. In one embodiment, the lanthanide containing material comprises a lanthanide containing sulfide, such as lanthanum oxysulfide, europium oxysulfide, praseodymium oxysulfide, cerium oxysulfide, samarium oxysulfide, or neodymium oxysulfide. In another embodiment, the lanthanide containing material comprises lanthanum sulfide or praseodymium sulfide. In yet another embodiment, the lanthanide containing material comprises a lanthanide containing oxysulfate, such as lanthanum oxysulfate, europium oxysulfate, praseodymium oxysulfate, cerium oxysulfate, samarium oxysulfate, or neodymium oxysulfate. The nanocatalysts may be impregnated in the layer by any suitable impregnation method, such as a sol-gel process or ultrasonic spraying.

The membrane layer 506 may be disposed on the catalytic film 504, which may be disposed on the porous support layer 502. In one embodiment, the membrane layer 506 is deposited on the catalytic film 504 by ALD. The ALD Pd membrane layer 506 has a suitable thickness which provides for improved gas permeability without compromising selectivity.

Figure 6:
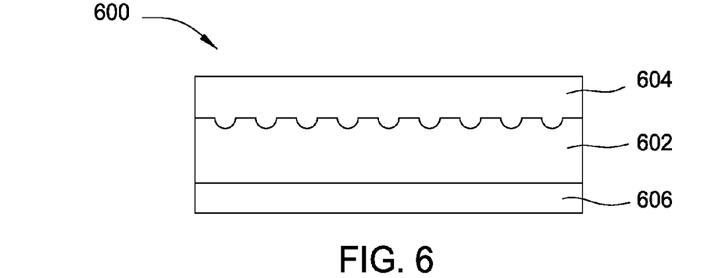
FIG. 6 schematically illustrates a membrane module for use in an apparatus for simultaneous generation and separation processes according to embodiments described herein.

FIG. 6 schematically illustrates a catalytic membrane module 600 for use in an apparatus for simultaneous generation and separation processes according to another embodiment described herein. The catalytic membrane module 600 may be placed in any suitable membrane reactor for gas to gas or gas to liquid generation and purification, such as hydrogen generation and purification. An example of the membrane reactor is a CCMR. The catalytic membrane module 600 includes a catalytic film 604, a membrane layer 606 and a porous support layer 602 disposed between the catalytic film 604 and the membrane layer 606. The porous support layer 602 may comprise the same material as the porous support layer 502 described in FIG. 5, the membrane layer 606 may comprise the same material as the membrane layer 506 described in FIG. 5, and the catalytic film 604 may comprise the same material as the catalytic film 504 described in FIG. 5. Unlike the structure 500 shown in FIG. 5, the membrane layer 606 is disposed on the porous support layer 602.

In one embodiment, the porous support layer 602 may comprise porous stainless steel and the membrane layer 606 is deposited on the porous support layer 602 by ALD using $Pd(hfac)_2$ and formalin as precursors. A seed layer (not shown) may be disposed between the porous support layer 602 and the membrane layer 606 to improve adhesion. In one embodiment, the seed layer may comprise alumina. The configuration of the catalytic membrane module 600 shown in FIG. 6 can prevent the Pd membrane layer 606 from sulfur poisoning by shrinking the pore size of the catalytic film 604 with deposited nanocatalysts and sulfur adsorption on the nanocatalyst particles. The catalytic membrane module 600 is not limited to gas separation and can be applied to liquid-base reactions/separations and gas-liquid-solid processes with heterogeneous catalysts, such as Fisher-Tropsch synthesis to produce liquid fuels.

Figure 7:
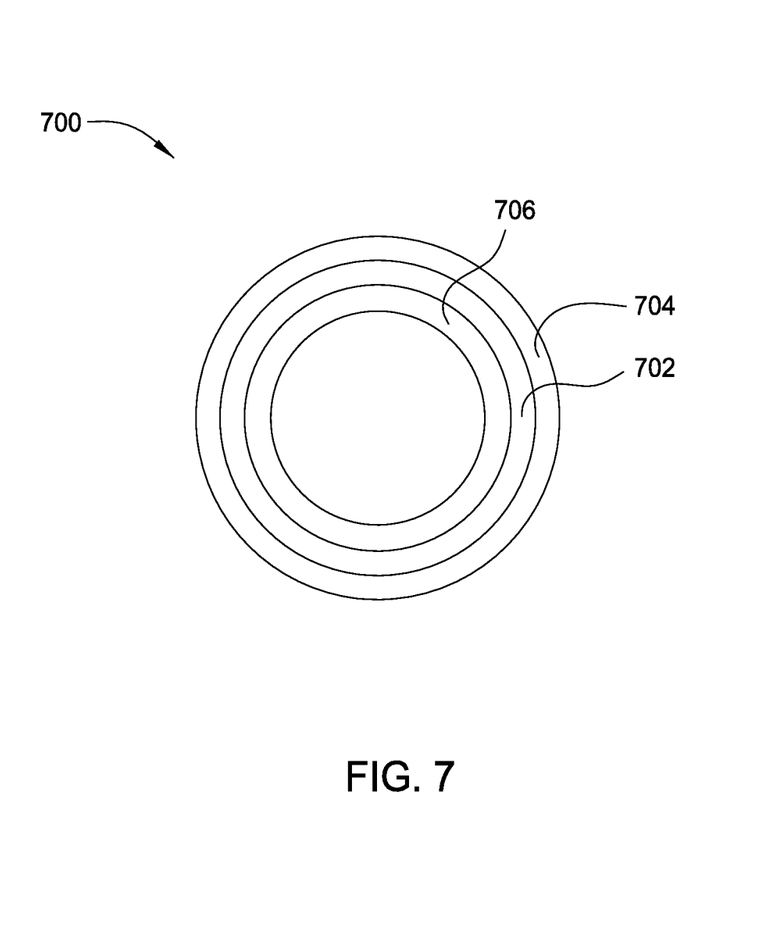
FIG. 7 is a schematic cross sectional view of a membrane module for use in an apparatus for simultaneous generation and separation processes according to embodiments described herein.

FIG. 7 is a schematic cross sectional view of a catalytic membrane module 700 for use in an apparatus for simultaneous generation and separation processes according to another embodiment described herein. The catalytic membrane module 700 may be placed in any suitable membrane reactor for gas to gas or gas to liquid generation and purification, such as hydrogen generation and separation reactors. The catalytic membrane module 700 is a tube having three layers 702, 704, 706. The inner layer 706 may comprise the same material as the membrane layer 606, the middle layer 702 may comprise the same material as the porous support layer 602 and the outer layer 704 may comprise the same material as the catalytic film 604. In one embodiment, the middle layer 702 comprises porous stainless steel, which is selected due to mechanical stability at high operating pressure and temperature. The catalytic layer 704 is disposed on the outer surface of the middle layer 702. The catalytic film 704 may comprise a layer, such as a $ZrO_2$ layer, that is impregnated with nano-sized particles, such as lanthanide containing nanocatalysts. In one embodiment, the catalytic film has a thickness of about 20 microns to about 200 microns, which can greatly enhance hydrogen production efficiency by circumventing mass transfer limitations with a much shorter transport path. In addition, heat management challenges can also be addressed with exothermic reactions with the significantly increased gas flow rates on both feed and permeate sides. The porous $ZrO_2$ layer also provides higher surface area per volume to increase catalytic contact area for reactants, resulting in higher conversion and production yield.

Before testing the membrane module 700 in a WGS reaction, permeability testing was carried out with 15% $H_2$ balanced in $N_2$ at the total flow rate of 1 SLPM, 50 psi system pressure and room temperature. A similar CCMR configuration by coating porous stainless steel with micron-sized $CuO/Al_2O_3$ was recently reported and tested in the same testing condition as discussed above. Table shown below summarizes the comparison between the CCMR with nano-sized europium oxysulfide and micron-sized $CuO/Al_2O_3$. The catalytic film 704 with impregnated nano europium oxysulfide is about 30 microns thick, which is much thinner than the 500 micron $CuO/Al_2O_3$ catalytic film. Consequently, the $H_2$ permeance through the catalytic layer 704 is about 15 times higher than that through the $CuO/Al_2O_3$ layer. Therefore, the nano-sized catalyst facilitates utilization of thin catalytic films, which exhibit high $H_2$ permeability.

| Catalytic Tube | Nano-$Eu_2O_2S$ catalytic film + SS | $CuO/Al_2O_3$ catalytic film + SS* |
|---|---|---|
| Thickness (μm) | ~30 | ~500 |
| Balance Gas Permeate (mol/m² s Pa$^{0.5}$) | 3.84E-06 ($N_2$) | 2.85E-07 (Ar) |
| $H_2$ Permeate (mol/m² s Pa$^{0.5}$) | 1.02E-05 | 6.51E-07 |
| Selectivity | 2.65 ($H_2/N_2$) | 2.28 ($H_2$/Ar) |

*Comparison sample using micron-sized particles that do not contain lanthanide

Figure 8:
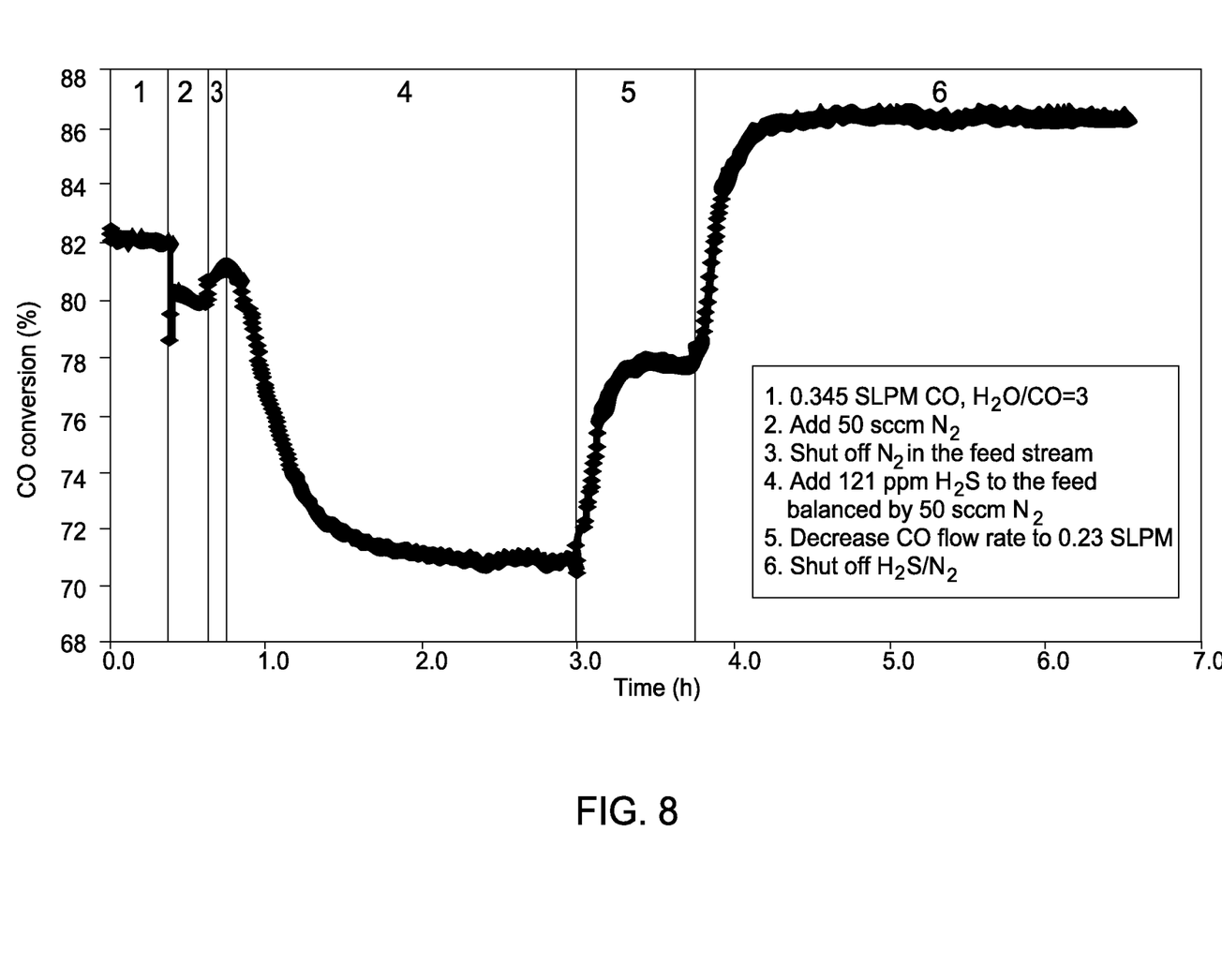
FIG. 8 is a chart illustrating sulfur tolerant testing of the membrane module shown in FIG. 7 according to one embodiment described herein.

FIG. 8 is a chart illustrating sulfur tolerant testing of the membrane module 700 according to one embodiment. The sulfur tolerance testing of the nano-sized $Eu_2O_2S$ catalysts indicated that hydrogen sulfide ($H_2S$) did hinder CO conversion rate, resulting in an approximately 10% decrease in CO conversion after adding 121 ppm of $H_2S$ in 0.345 SLPM of CO flow rate. However, after removing $H_2S$ from the feed stream, the CO conversion rate of the WGS reaction was largely recovered to what was in a sulfur-free environment after one hour.

The table shown below compares the activity of nanocatalysts for WGS reactions with and without sulfur to the micron-sized lanthanide oxysulfide catalysts and conventional Fe—Cr catalysts. The comparison shows that the nanocatalysts have better or comparable performance in CO conversion and impressive sulfur-resistance, despite different feed concentrations of CO (the micro-sized catalysts were tested in 2% CO-10% $H_2O$—$N_2$ feed). Compared to the micron-sized lanthanide oxysulfide catalysts, nano-scale $Eu_2O_2S$ demonstrated higher CO conversion at lower reaction temperature. At 550° C., conventional Fe—Cr catalysts achieved 90% CO conversion, where the micron-sized lanthanide oxysulfide catalysts only achieved <50% CO conversion. In addition, the micron-sized catalysts require a temperature of 650° C. or higher to obtain enhanced conversion. On the contrary, the nano-$Eu_2O_2S$ catalysts can achieve 92% CO conversion at 550° C., which is 2% higher than the conventional iron catalysts, with enhanced CO conversion being obtained at a reaction temperature 100° C. lower than with the micron-sized catalysts. After adding 121 ppm sulfur in the feed, iron catalyst activity decreased by 50% relative to the CO conversion in a sulfur-free environment. However, the $Eu_2O_2S$ nanocatalyst activity decreased by between about 10% and about 20% relative to CO conversion in a sulfur-free environment. The $Eu_2O_2S$ nanocatalyst significantly outperformed the conventional iron catalysts under similar conditions. It is also worth noting that 97% of the $Eu_2O_2S$ nanocatalyst activity was recovered after shutting off the 121 ppm $H_2S$ in the feed for half an hour. The higher active surface area of nanoscale $Eu_2O_2S$ for sulfur adsorption may have slightly compromised the sulfur-tolerance of the nanoscale $Eu_2O_2S$ compared to micron-sized lanthanide oxysulfide catalysts.

| Temperature | $H_2S$ concentration (ppm) | | | | | |
|---|---|---|---|---|---|---|
| | 0 | | | 121 | | |
| (° C.) | Fe/Cr | Micron | Nano | Fe/Cr | Micron | Nano |
| 400 | 79 | ~ | ~ | 50 | ~ | ~ |
| 550 | 90 | 35 | 92.2 | 57 | ~ | 70 |
| 600 | 87 | 50 | 88.7 | 54 | 30 | ~ |
| 650 | 85 | 50 | 90.2 | 53 | 50 | 77.9 |

Similarly, the lanthanide oxysulfate nanocatalyst achieved ~70% CO conversion as compared to the micron-scale lanthanide oxysulfate catalyst in a packed bed reactor, which achieved approximately 20% CO conversion under similar CO and $H_2O$ feed concentrations. It is contemplated that the unique morphologies and surface structures of the nanocatalysts, the reduced particle size of the nanocatalysts, and the configuration of the embodiments of the present disclosure contribute to the enhanced reaction rates. Compared to the micron-sized catalysts, more $S^{-2}$ atoms may be exposed on the nanocatalyst surface per gram of catalyst, which accelerates the reduction ($La_2O_2SO_4$ to $La_2O_2S$) and oxidation processes ($La_2O_2S$ to $La_2O_2SO_4$).

It is contemplated that embodiments described herein may be used on and or modified to accommodate application on a commercial or industrial scale. It is further contemplated that the nanocatalysts of the present disclosure increase the activity of $Ln_2O_2SO_4/Ln_2O_2S$ catalysts and may be advantageously employed in coal gasification processes for performing WGS reactions and similar simultaneous generation and separation processes.

While the foregoing is directed to embodiments, other and further embodiments of the disclosure may be devised without departing from the basic scope thereof, and the scope thereof is determined by the claims that follow.

What is claimed is:
1. A method for forming nanocatalysts, comprising:
   mixing at least one organic solvent with at least one surfactant to form a composition;

mixing the composition with a lanthanide containing material to form a lanthanide containing sulfide nanocatalyst; and exposing the lanthanide containing sulfide nanocatalyst to oxygen and heat to form a lanthanide containing oxysulfate nanocatalyst.

2. The method of claim 1, wherein the organic solvent comprises toluene, hexane, or combinations and mixtures thereof.

3. The method of claim 1, wherein the at least one surfactant is selected from the group consisting of oleylamine, oleic acid, and octadecene.

4. The method of claim 1, wherein the lanthanide containing sulfide nanocatalyst comprises europium oxysulfide, lanthanum sulfide, or praseodymium sulfide.

5. The method of claim 1, wherein the lanthanide containing oxysulfate nanocatalyst comprises lanthanum oxysulfate or praseodymium oxysulfate.

6. The method of claim 1, wherein the lanthanide containing oxysulfate nanocatalyst comprises a palladium containing catalytic film.

7. A method for forming a catalytic film, comprising:
mixing at least one organic solvent with at least one surfactant to form a composition;
mixing the composition with a lanthanide containing material to form a lanthanide containing sulfide nanocatalyst;
exposing the lanthanide containing sulfide nanocatalyst to oxygen and heat to form a lanthanide containing oxysulfate nanocatalyst;
exposing a porous oxide layer of a catalytic membrane module to the lanthanide containing oxysulfate nanocatalyst to impregnate the porous oxide layer with the lanthanide containing oxysulfate nanocatalyst to form a catalytic film, wherein the catalytic membrane module comprises the catalytic film disposed between a membrane layer and a substrate.

8. The method of claim 7, wherein the catalytic film, the membrane layer, and the substrate are formed in a tubular geometry or a planar geometry.

9. The method of claim 7, wherein the substrate comprises porous stainless steel or a ceramic material.

10. The method of claim 7, wherein the lanthanide containing oxysulfate nanocatalyst comprises lanthanum oxysulfate or praseodymium oxysulfate.

11. The method of claim 7, wherein the porous oxide layer comprises zirconium oxide.

12. The method of claim 7, wherein the catalytic membrane module is configured to be used in a compact catalytic membrane reactor.

13. The method of claim 7, wherein the membrane layer comprises palladium or a palladium alloy.

14. A method for forming a catalytic film, comprising:
mixing at least one organic solvent with at least one surfactant to form a composition;
mixing the composition with a lanthanide containing material to form a lanthanide containing sulfide nanocatalyst;
exposing the lanthanide containing sulfide nanocatalyst to oxygen and heat to form a lanthanide containing oxysulfate nanocatalyst;
exposing a porous oxide layer of a catalytic membrane module to the lanthanide containing oxysulfate nanocatalyst to impregnate the porous oxide layer with the lanthanide containing oxysulfate nanocatalyst to form a catalytic film, wherein the catalytic membrane module comprises a substrate disposed between the catalytic film and a membrane layer.

15. The method of claim 14, wherein the catalytic film, the membrane layer, and the substrate are formed in a tubular geometry or a planar geometry.

16. The method of claim 14, wherein the substrate comprises porous stainless steel or a ceramic material.

17. The method of claim 14, wherein the lanthanide containing oxysulfate nanocatalyst comprises lanthanum oxysulfate or praseodymium oxysulfate.

18. The method of claim 14, wherein the porous oxide layer comprises zirconium oxide.

19. The method of claim 14, wherein the catalytic membrane module is configured to be used in a compact catalytic membrane reactor.

20. The method of claim 14, wherein the membrane layer comprises palladium or a palladium alloy.

* * * * *